United States Patent [19]

Strongin et al.

[11] Patent Number: 6,002,801
[45] Date of Patent: Dec. 14, 1999

[54] METHOD AND APPARATUS FOR IMPROVED VIDEO DECOMPRESSION BY SELECTION OF IDCT METHOD BASED ON IMAGE CHARACTERISTICS

[75] Inventors: Geoffrey S. Strongin; Yi Liu; Michael R. Tucker, all of Austin, Tex.

[73] Assignee: Advanced Micro Devices, Inc., Sunnyvale, Calif.

[21] Appl. No.: 08/423,913

[22] Filed: Apr. 18, 1995

[51] Int. Cl.$^6$ .............................. G06K 9/36; G06K 9/40; H04N 11/02; G11B 7/00

[52] U.S. Cl. ......................... 382/233; 382/238; 382/250; 348/384; 348/403; 358/430; 369/124

[58] Field of Search ..................................... 382/233, 250, 382/238; 348/395, 403, 384; 358/432, 433, 430; 369/124

[56] References Cited

U.S. PATENT DOCUMENTS

| | | | |
|---|---|---|---|
| 3,918,047 | 11/1975 | Denes | 340/347 DD |
| 4,797,944 | 1/1989 | Tanaka | 382/56 |
| 5,164,828 | 11/1992 | Tahara et al. | 358/136 |

(List continued on next page.)

FOREIGN PATENT DOCUMENTS

| | | | |
|---|---|---|---|
| 0 283 735 | 2/1988 | European Pat. Off. | H03M 7/30 |
| 0 493 086 | 12/1991 | European Pat. Off. | H03M 7/46 |
| 2 267 410 | 5/1993 | United Kingdom | H04N 7/137 |

OTHER PUBLICATIONS

Dr. Richard Baker, "Standards Dominate Videoconferencing Implementations", *Computer Design*, Dec. 1994, pp. 66–70.

Stephen Ohr, "Digital Video Spearheads TV and Videoconferencing Applications", *Computer Design*, Dec. 1994, pp. 59–64.

Lawrence A. Rowe, et al., "MPEG Video in Software: Representation, Transmission, and Playback", High Speed Networking and Multimedia Computing, *Symp. on Elec. Imaging Sci. & Tech.*, San Jose, CA, Feb. 1994, pp. 1–11.

Peng H. Ang, et al., "Video Compression Makes Big Gains", *IEEE Spectrum*, Oct. 1991, pp. 16–19.

Andy C, Hung, et al, "A Comparison of Fast Inverse Discrete Cosine Transform Algorithms", *Multimedia Systems*, ©1994, pp. 204–217.

P1180/D1, "Draft Standard Specification for the Implementation of 8×8 Inverse Discrete Cosine Transform", May 29, 1990, pp. 1–9.

ISO/IEC 11172–1, Information Technology–Coding of Moving Pictures and Associated Audio for Digital Stores Media at up to about 1,5 Mbit/s –Part 1: Systems, Aug., 01, 1993, pp. i–vi, 1–53.

ISO/IEC 11172–2, Information Technology–Coding of Moving Pictures and Associated Audio for Digital Storage Media at up to about 1,5 Mbit/s –Part 1: Video, Aug., 01, 1993, pp. i–ix, 1–112.

ISO/IEC 11172–3, Information Technology–Coding of Moving Pictures and Associated Audio for Digital Storgae Media at up to about 1,5 Mbit/s –Part 1: Audio, Aug., 01, 1993, pp. i–vi, 1–150.

Kevin L. Gong, et al., "Parallel MPEG–1 Video Encoding", Report, University of California, Berkeley, Computer Science Division, 1994, pp. 1–14.

*Primary Examiner*—Andrew Johns
*Assistant Examiner*—Monica S. Davis
*Attorney, Agent, or Firm*—Skjerven, Morrill, MacPherson, Franklin & Friel LLP; Ken J. Koestner

[57] ABSTRACT

A video decoding system examines a block of DCT coefficients prior to computation of an inverse discrete cosine transform (IDCT) to determine the number of nonzero coefficients. A plurality of IDCT engines are available in the video system including an IDCT engine utilizing fewer computations for a sparse picture and an IDCT engine utilizing fewer computations for a nonsparse picture. The video decoding system selects an IDCT engine to minimize the number of computations performed and to thereby reduce the computational burden of IDCT transformation.

8 Claims, 7 Drawing Sheets

U.S. PATENT DOCUMENTS

| | | | |
|---|---|---|---|
| 5,227,878 | 7/1993 | Puri et al. | 358/136 |
| 5,241,395 | 8/1993 | Chen | 358/261.3 |
| 5,247,363 | 9/1993 | Sun et al. | 358/167 |
| 5,253,053 | 10/1993 | Chu et al. | 358/133 |
| 5,289,577 | 2/1994 | Gonzales et al. | 395/163 |
| 5,315,670 | 5/1994 | Shapiro | 382/56 |
| 5,333,212 | 7/1994 | Ligtenberg | 382/56 |
| 5,347,308 | 9/1994 | Wai | 348/394 |
| 5,357,282 | 10/1994 | Lee | 348/403 |
| 5,371,547 | 12/1994 | Siracusa et al. | 348/426 |
| 5,371,611 | 12/1994 | Kato et al. | 358/433 |
| 5,379,070 | 1/1995 | Retter et al. | 348/403 |
| 5,386,232 | 1/1995 | Golin et al. | 348/391 |
| 5,400,075 | 3/1995 | Savatier | 348/384 |
| 5,410,553 | 4/1995 | Choon | 371/31 |
| 5,450,599 | 9/1995 | Horvath et al. | 395/800 |
| 5,452,104 | 9/1995 | Lee | 358/433 |
| 5,467,131 | 11/1995 | Bhaskaran et al. | 348/384 |
| 5,481,364 | 1/1996 | Ito | 358/261.1 |
| 5,489,944 | 2/1996 | Jo | 348/405 |
| 5,490,130 | 2/1996 | Akagiri | 369/124 |
| 5,502,493 | 3/1996 | Meyer | 348/426 |
| 5,510,840 | 4/1996 | Yonemitsu et al. | 348/402 |
| 5,523,847 | 6/1996 | Feig et al. | 382/250 |
| 5,543,846 | 8/1996 | Yagasaki | 348/415 |
| 5,552,832 | 9/1996 | Astle | 348/420 |
| 5,563,928 | 10/1996 | Rostoker et al. | 377/20 |
| 5,576,958 | 11/1996 | Kawakatsu et al. | 364/725 |
| 5,625,714 | 4/1997 | Fukuda | 382/233 |

```
initialize 410 {
    evaluate processor 420;
    select non-zero coefficient threshold $N_{NZMIN}$, DCT
        coefficient cutoff frequency $F_{CUT}$ and DCT
        coefficient cutoff magnitude $M_{CUT}$ according to
        processor evaluation 430;
    pre-compute commonly occurring kernels 440;
}

IDCT procedure 450 {
    preprocess DCT coefficient block 460 {
        if(frequency preprocess selected) preprocess
            block using threshold frequency F;
        if(magnitude preprocess selected) preprocess
            block using threshold magnitude M;
        if(combination preprocess selected) preprocess
            block using combined frequency and magnitude
            F/M;
    }
    evaluate coefficients step 470;
    select IDCT procedure 480 {
        if (sparse block){
            if (number of non-zero coeff .LT. N) {
                select null IDCT procedure;
            } else {
                if (commonly occurring coefficients){
                    select prestored kernels
                } else {
                    select   sparse   block   IDCT
                        procedure;
                }
            }
        } else if (non-sparse block) select non-sparse
            block IDCT procedure;
    }
    .
    .
    .
    compute IDCT 490;
    .
    .
    .
    monitor frame rate 496;
    adjust IDCT parameters 498;
    .
    .
    .
}
```

METHOD AND APPARATUS FOR IMPROVED VIDEO DECOMPRESSION BY SELECTION OF IDCT METHOD BASED ON IMAGE CHARACTERISTICS

RELATED PATENT APPLICATIONS

The present invention is related to subject matter which is disclosed in:

U.S. patent application Ser. No. 08/423,914 filed on the same day as the present patent application (Geoffrey S. Strongin, Yi Liu and Michael R. Tucker, "Method and Apparatus for Improved Video Decompression by Pre-determination of IDCT Results Based on Image Characteristics", Attorney Docket Number M-3280), U.S. patent application Ser. No. 08/423,918 filed on the same day as the present patent application (Michael R. Tucker, Geoffrey S. Strongin and Yi Liu, "Method and Apparatus for Improved Video Decompression by Prescaling of Pixel and Error Terms Prior to Merging", Attorney Docket Number M-3224), U.S. patent application Ser. No. 08/423,912 filed on the same day as the present patent application (Yi Liu, Michael R. Tucker and Geoffrey S. Strongin, "Method and Apparatus for Improved Video Decompression by Selective Reduction of Spatial Resolution", Attorney Docket Number M-3225), and U.S. patent application Ser. No. 08/424,738 filed on the same day as the present patent application (Yi Liu, Michael R. Tucker and Geoffrey S. Strongin, "Method and Apparatus for Hybrid VLC Bitstream Decoding", Attorney Docket Number M-3226), and U.S. patent application Ser. No. 08/424,736 filed on the same day as the present patent application (Geoffrey S. Strongin, Yi Liu and Michael R. Tucker, "Method and Apparatus for Prestoring Dequantization Information for DCT VLC Decoding", Attorney Docket Number M-3227).

Each of the identified patent applications is incorporated herein by reference in its entirety.

The present invention is related to subject matter which is disclosed in:

U.S. patent application Ser. No. 08/443,206 filed on the same day as the present patent application (Yi Liu, Michael R. Tucker, and Geoffrey S. Strongin, "Method and Apparatus for Improved Video Decompression by Adaptive Selection of Video Input Parameters", Attorney Docket Number M-3228).

FIELD OF INVENTION

The present invention relates to decompression of video information and, more particularly, to improved performance of video decompression by selective optimization of inverse discrete cosine transformation based on characteristics of image data.

BACKGROUND OF THE INVENTION

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a picture. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the moving pictures expert group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition Aug. 1, 1993 which is hereby incorporated by reference in its entirety.

Pictures within the MPEG standard are divided into 16×16 pixel macroblocks. Each macroblock includes six 8×8 blocks: four luminance (Y) blocks, one chrominance red (Cr) block and one chrominance blue (Cb) block. The luminance blocks correspond to sets of 8×8 pixels on a display and control the brightness of respective pixels. The chrominance blocks to a large extent control the colors for sets of four pixels. For each set of four pixels on the display, there is a single Cr characteristic and a single Cb characteristic.

Figure 1:
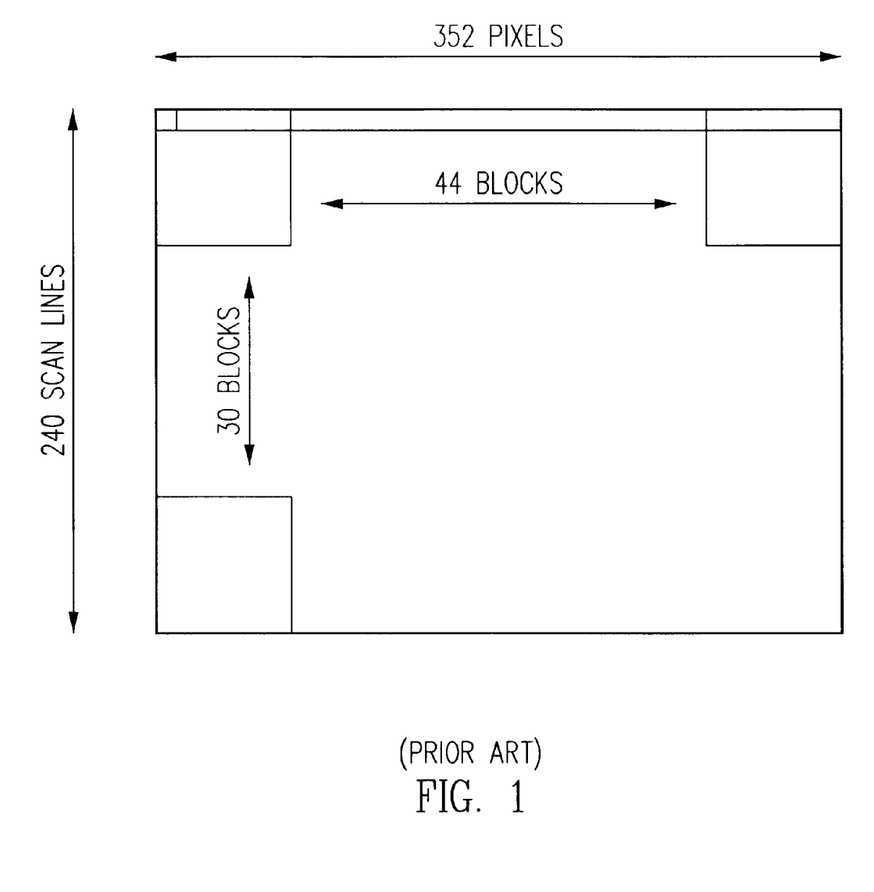
FIG. 1, labeled prior art, shows an arrangement of blocks of pixels on a display screen.

For example, referring to FIG. 1, labeled prior art, a picture presented by a typical display includes 240 lines of video information in which each line has 352 pixels. Accordingly, a picture includes 240×352=84,480 pixel locations. Under the MPEG standard, this picture of video includes 44 by 30 luminance blocks or 1320 blocks of luminance video information. Additionally, because each macroblock of information also includes two corresponding chrominance blocks, each picture of video information also includes 330 Cr blocks and 330 Cb blocks. Accordingly, each picture of video information requires 126,720 pixels or a total of 1,013,760 bits of bit mapped storage space for presentation on a display.

There are three types of pictures of video information which are defined by the MPEG standard, intra-pictures (I picture), forward predicted pictures (P picture) and bi-predicted pictures (B picture).

An I picture is encoded as a single image having no reference to any past or future picture. Each block of an I picture is encoded independently. Accordingly, when decoding an I picture, no motion processing is necessary. However, for the reasons discussed below, it is necessary to store and access I pictures for use in decoding other types of pictures.

A P picture is encoded relative to a past reference picture. A reference picture is a P or I picture. The past reference picture is the closest preceding reference picture. Each macroblock in a P picture can be encoded either as an I macroblock or as a P macroblock. A P macroblock is stored as a translated 16×16 area of a past reference picture plus an error term. To specify the location of the P macroblock, a motion vector (i.e., an indication of the relative position of the macroblock in the current picture to the position of the translated area in the past reference picture) is also encoded. When decoding a P macroblock, the 16×16 area from the reference picture is offset according to a motion vector. The decoding function accordingly includes motion compensation, which is performed on a macroblock, in combination with error (IDCT) terms, which are defined on a block by block basis.

A B picture is encoded relative to the past reference picture and a future reference picture. The future reference picture is the closest proceeding reference picture. Accordingly, the decoding of a B picture is similar to that of an P picture with the exception that a B picture motion vector may refer to areas in the future of the reference picture. For macroblocks that use both past and future reference pictures, the two 16×16 areas are averaged. The macroblocks from the reference pictures are offset according to motion vectors.

Pictures are coded using a discrete cosine transform (DCT) coding scheme which transforms pixels (or error terms) into a set of coefficients corresponding to amplitudes of specific cosine basis functions. The discrete cosine transform is applied to image compression to decorrelate picture data prior to quantization. The DCT coefficients are further coded using variable length coding. Variable length coding (VLC) is a statistical coding technique that assigns codewords to values to be encoded. Values of high frequency of occurrence are assigned short codewords, and those of infrequent occurrence are assigned long codewords. On the average, the more frequent shorter codewords dominate so that the code string is shorter than the original data.

For a video system to provide a motion video capability, compressed video information must be quickly and efficiently decoded. One aspect of the decoding process is inverse discrete cosine transformation (IDCT). A second aspect is a motion compensation operation. Both the IDCT operation and the motion compensation operation are computationally intensive operations. Over a wide range of processor capabilities and image characteristics, a condition sometimes arises in which the picture decoding operation overburdens a video system. Under this condition, video frames are commonly dropped or a lag in motion video results. A technique for providing such highly efficient inverse discrete transformation and decoding is necessary.

SUMMARY OF THE INVENTION

In accordance with a first aspect of the present invention, a video decoding system examines a block of DCT coefficients prior to computation of an inverse discrete cosine transform (IDCT) to determine the number of nonzero coefficients. A plurality of IDCT engines are available in the video system including an IDCT engine utilizing fewer computations for a sparse picture having few nonzero terms and an IDCT engine utilizing fewer computations for a nonsparse picture having many nonzero terms. The video decoding system selects an IDCT engine to minimize the number of computations performed and to thereby reduce the computational burden of IDCT transformation.

In accordance with a second aspect of the present invention, the decoding system selectively sets various nonzero coefficients to a zero value to reduce computational load. In some embodiments, the decoding system eliminates all coefficients at frequencies higher than a selected cutoff frequency. In some embodiments, the decoding system eliminates all coefficients having a magnitude smaller than a selected threshold magnitude.

The video decoding apparatus taught herein is advantageous for greatly reducing the computational burden of video decoding by selecting a highly efficient inverse discrete cosine transform (IDCT) which is optimized for particular picture characteristics.

DETAILED DESCRIPTION

Figure 2:
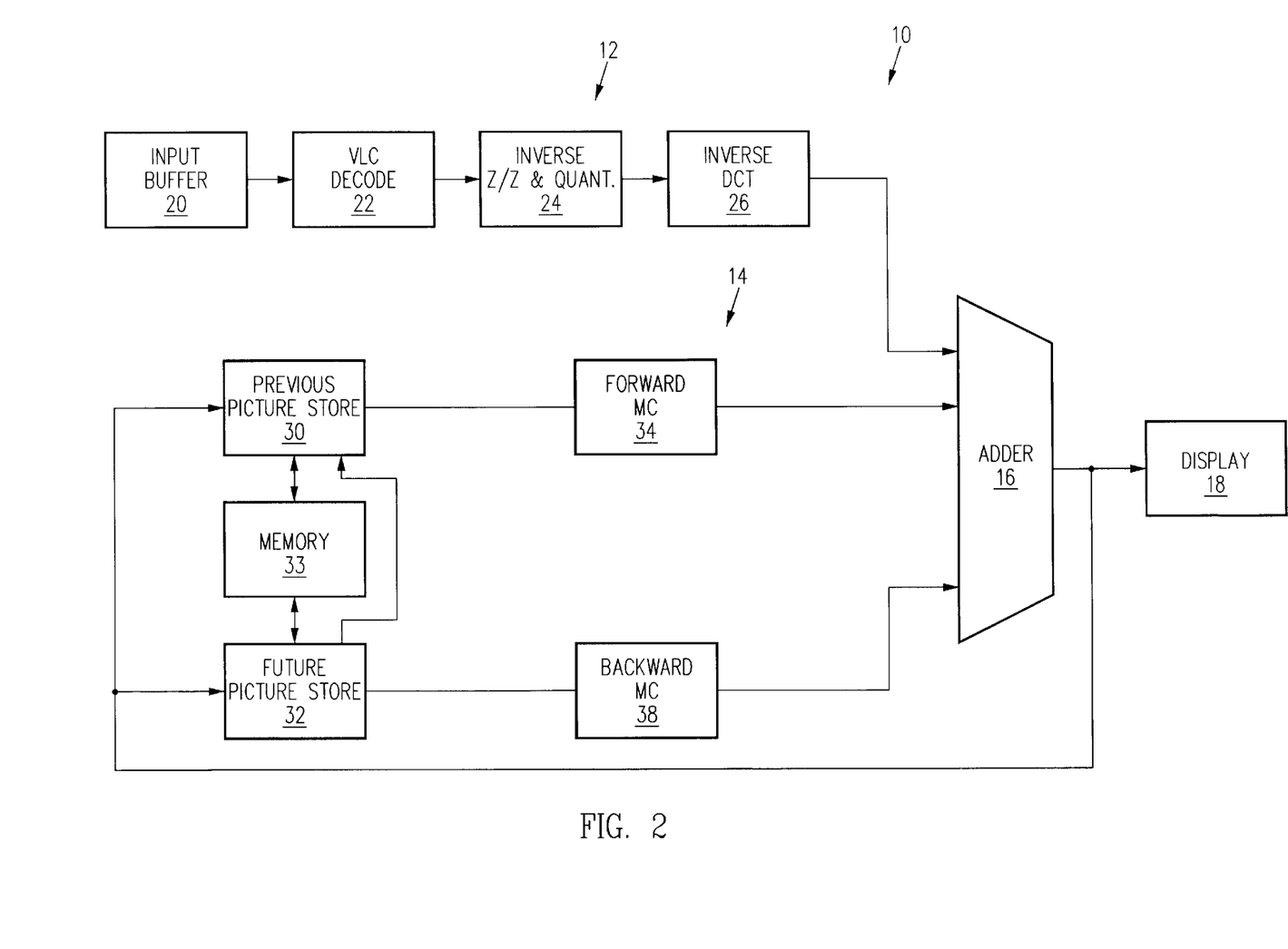
FIG. 2 shows a block diagram of a decoder video system in accordance with the present invention.

Referring to FIG. 2, a system for decompressing video information is shown. Video system 10 includes input stream decoding portion 12 incorporating an inverse discrete cosine transformation, motion decoding portion 14, adder 16 and display device 18. Input stream decoding portion 12 receives a stream of compressed video information and provides blocks of statically decompressed video information to adder 16. Motion decoding portion 14 receives motion information and provides motion compensation information to adder 16. Adder 16 receives the statically decompressed video information and the motion compensation information and provides decompressed video information to display 18.

Input stream decoding portion 12 includes input buffer 20, variable length coding (VLC) decoder 22, inverse zig-zag and quantizer circuit 24 and inverse digital cosine transform circuit 26. Motion decoding portion 14 includes previous picture store circuit 30, future picture store circuit 32, memory 33, forward motion compensation circuit 34 and backward motion compensation circuit 38. Display device 18 includes a picture buffer (not shown) which allows information provided by adder 16 to be rasterized prior to display by display device 18.

Input stream decoding portion 12 provides statically decompressed video signals to adder 16 on a block-by-block basis. Additionally, forward motion compensation circuit 34 and backward motion compensation circuit 38 of motion decoding portion 14 provide motion compensation signals to adder 16 on a macroblock by macroblock basis. Adder 16 provides a decompressed video signal to display 18 on a picture by picture basis. The decompressed video signal is also provided as a previous picture signal to previous picture store circuit 30 and future picture store circuit 32 (in the case of an I or P picture).

Figure 3:
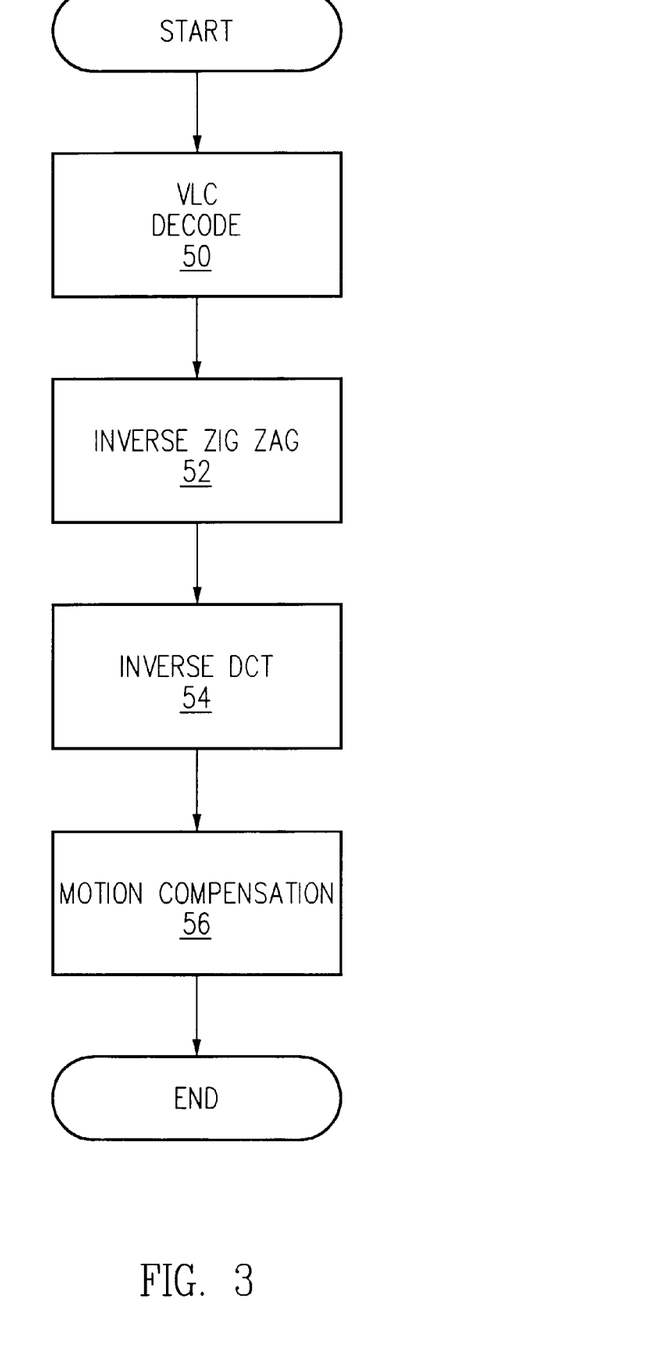
FIG. 3 shows a flow chart of the decoding of video information which is encoded using the MPEG standard.

Referring to FIGS. 2 and 3, in operation, input buffer 20 receives a compressed video signal in the form of a bitstream from a video signal source such as a CD ROM (not shown); the compressed video signal is provided as a stream of compressed video information. Input buffer 20 buffers this compressed video signal to compensate for the speed which the signal is provided by the video source. The input bitstream is accumulated in the input buffer 20 until the bitstream data is to be utilized. This buffered compressed video signal is provided to VLC decoder 22 which decodes the variable length coded portion of the compressed signal at VLC decoding step 50 to provided a variable length decoded signal.

The variable length decoded signal is provided to inverse zig-zag and quantizer circuit 24 which, at inverse zig-zag and quantization step 52, decodes the variable length coded signal to provide a zig-zag decoded signal. Inverse zig-zag and quantizer circuit 24 produces actual DCT coefficients using a preset quantization step size. When a signal is encoded, data is run-length encoded in zig-zag ordering across an image so that compression is optimized. In general, most of the energy in an image is concentrated at the low frequency coefficients, which are conventionally written in the upper left corner of the transformed matrix. Therefore, image data which has been converted to a frequency representation typically has larger coefficients at lower spatial frequencies, clustered at the upper left corner of a frequency image block. Coefficients typically decrease along rays extending from the zero-frequency, or DC, term to higher spatial frequency terms. A block of data is compressed by discrete cosine transform (DCT) coefficient quantization. Most of the information in a block is contained in the lower frequency coefficients. Quantization serves to remove small coefficients—coefficients that are smaller than a quantization step. Higher frequency coefficients have a larger quantization step. Zig-zag ordering is used to reorder the quantized discrete cosine transform (DCT) block of coefficients so that non-zero coefficients are transmitted first, thereby increasing transmission efficiency. The inverse zig-zag and quantization step 52 compensates for the fact that, while a compressed video signal is compressed in a zig-zag run length code fashion, the zig-zag decoded signal is provided to inverse DCT circuit 26 as sequential blocks of video information. Accordingly, this zig-zag decoded signal provides blocks which are in a suitable order for raster scanning across display 18.

When a signal is encoded, an image block is first transformed from the spatial domain to the frequency domain using the Discrete Cosine Transform (DCT), which separates the signal into independent frequency bands. Most of the frequency information is in the upper left corner of the resulting block. The zig-zag decoded signal is applied to inverse DCT circuit 26 to convert the frequency domain image into the spatial domain. The inverse DCT circuit 26, at inverse DCT step 54, performs an inverse digital cosine transform on the zig-zag decoded video signal on a block-by-block basis to provide a decompressed video signal. This de compressed video signal corresponds to either error terms for P or B-coded macroblocks or pixels for I-coded macroblocks.

The decompressed signal is provided to adder 16 which, if the signal does not include any motion information (i.e., I pictures) provides this signal to display 18. However, for video signals which include motion information (i.e., B pictures and P pictures), adder 16 uses the forward motion compensation and backward motion compensation outputs from motion decode portion 19 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

VLC decoder 22 decodes a sequence of pictures in the following manner. VLC decoder 22 first decodes the header of a first picture, called picture 0, and determines that it is an I-picture. VLC decoder 22 produces quantized coefficients corresponding to the quantized DCT coefficients. These are assembled for each 8 by 8 block of pixels in the image by inverse zig-zag scanning. VLC decoder 22 decodes the header of the next picture, picture 3, and determines that it is a P-picture. For each inter-coded macroblock, the VLC decoder 22 decodes motion vectors giving the displacement from the stored previous picture, and quantized coefficients corresponding to the quantized DCT coefficients. The quantized DCT coefficients are error terms in the form of a difference block. For an intra-coded macroblock, all six blocks include IDCT values. For inter-coded or predicted macroblocks, not all six blocks include IDCT error terms. These quantized coefficients are inverse quantized to produce actual DCT coefficients. The coefficients are transformed into pixel difference values and added to the predicted block which are generated by applying the motion vectors to macroblocks in the stored previous picture. The resultant macroblock is displayed on display 18. This picture is not displayed until B-pictures 1 and 2 have been received, decoded, and displayed. VLC decoder 22 decodes the header of the next picture, picture 1, and determines that it is a B-picture. For each interceded macroblock, the VLC decoder decodes motion vectors giving the displacement from the stored previous or future pictures or both, and quantized coefficients corresponding to the quantized DCT coefficients of the difference block. These quantized coefficients are inverse quantized to produce actual DCT coefficients. The coefficients are inverse transformed into difference pixel values and added to a predicted macroblock produced by applying the motion vectors to the stored pictures. The resultant macroblock is stored in display 18. The macroblock is displayed at a suitable time.

During picture coding, a discrete cosine transform computation is performed on the 8×8 pixel blocks to decorrelate picture data before quantization in the process of image compression. DCT coefficients resulting from this decorrelation operation include many coefficients which are equal to zero. During the decoding process, few nonzero quantized coefficients are received so the input signal to the inverse DCT circuit 26 is generally a sparse data block.

The discrete cosine transform (DCT) is typically regarded as the most effective transform coding technique for image and video compression. Blocks of video information are converted into a transform domain which approximates a frequency domain for more efficient data compression. An inverse discrete cosine transform (IDCT) is used to convert the transform-domain data back to a spatial-domain form. A commonly used two-dimensional data block size is 8×8 pixels, which furnishes a good compromise between coding efficiency and hardware complexity.

The DCT is a discrete transform that is applied to sampled data, such as digital image data, rather than to a continuous waveform. A two-dimensional DCT operation converts a spatial image including a plurality of elements in two dimensions called pixels to a frequency domain representation made up of a plurality of two-dimensional elements termed DCT coefficients. Typical spatial image input data for a DCT slowly varies between spatial samples. This data is commonly considered to be low frequency or, equivalently expressed, highly correlated data. The term high correlation refers to the correlation between any sample and previous samples. Correlation is statistically expressed as a first-order correlation coefficient $\rho$, which is normalized to the variance of the sampled data. Highly correlated sampled signals have a power spectrum this is concentrated at low frequency. It follows that the frequency domain representation of the typical spatial image input data is a representation in which low frequency DCT coefficients, those coefficients located in the upper left corner of a standard frequency domain representation, have nonzero values and high frequency DCT coefficients often have a value of zero.

Usage of the DCT for image compression is advantageous because the transform converts N-point highly correlated input spatial vectors in the form of rows and columns of pixels into N-point DCT coefficient vectors including rows and columns of DCT coefficients in which high frequency coefficients are typically zero-valued. Energy of a spatial vector, which is defined by the squared values of each element of the vector, is preserved by the DCT transform so that all energy of a typical, low-frequency and highly-correlated spatial image is compacted into the lowest frequency DCT coefficients. Furthermore, the human psycho-visual system is less sensitive to high frequency signals so that a reduction in precision in the expression of high frequency DCT coefficients results in a minimal reduction in perceived image quality.

These characteristics of the DCT are exploited in the MPEG standard which specifies that images are to be encoded by DCT transforming 8×8 spatial blocks of an image and variable length coding (VLC) the DCT coefficients. VLC coding, which generates a code made up of DCT coefficient value levels and run lengths of the number of pixels between nonzero DCT coefficients, generates a highly compressed code when the number of zero-valued DCT coefficients is greatest.

Figure 4:
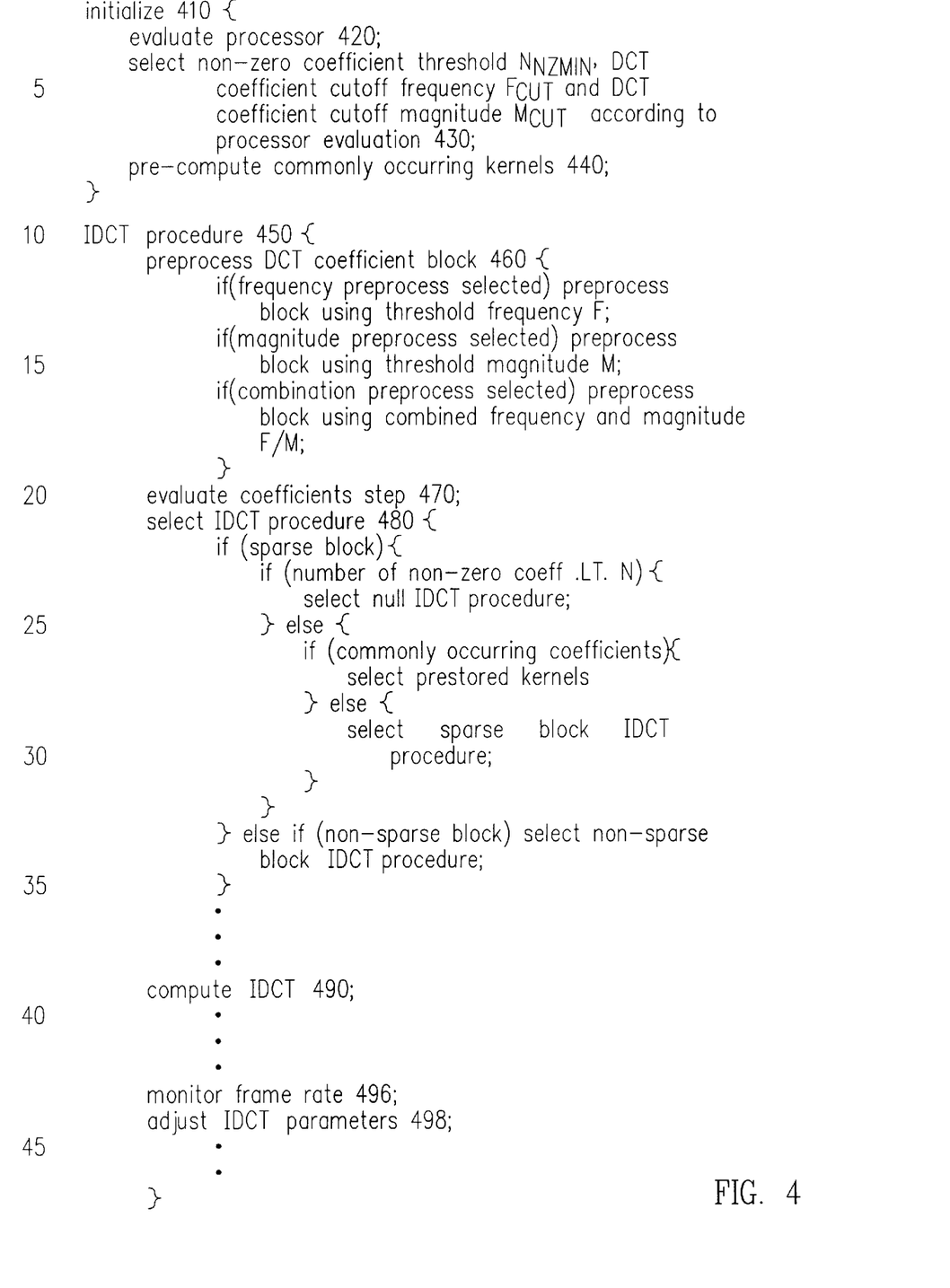
FIG. 4 illustrates pseudo-code for an embodiment of a procedure of video decompression by selective optimization of IDCT procedures.

Referring to FIG. 4, there is shown a pseudo-code for an embodiment of a procedure of video decompression by selective optimization of IDCT procedures. An initialize procedure 410 is performed at the system initialization, for example when the video system 10 is loaded or as a system bootstrap procedure. The initialize procedure 410 includes an evaluate processor routine 420, a select processor-dependent parameters routine 430 and a pre-compute commonly-occurring kernels routine 440. The evaluate processor 420 determines the hardware and software configurations of the computer system upon which the video system is operating. The operating system is typically a multi-media operating system, for example, Apple® QuickTime or Microsoft® Video for Windows running on a computer such as a personal computer with a general-purpose microprocessor. Typical microprocessors include x86 microprocessors such as a Am386 and Am486 series microprocessors manufactured by Advanced Micro Devices, Inc., Santa Clara, Calif. Other microprocessors include Am29000 and Am29050 RISC-type microprocessors. Evaluate processor routine 420 not only determines capabilities of the processor but also evaluates capabilities of special-purpose processors operating in conjunction with the microprocessor including video processors and floating point processors. A microprocessor type designation is read from special registers. Other processors are identified by reading of special registers.

After evaluation of a processor, select processor-dependent parameters routine 430 designates various parameters, such as a non-zero coefficient threshold $N_{bit}$ parameter, a cutoff frequency $F_{CUT}$ decision threshold parameter and a cutoff magnitude $M_{CUT}$ decision threshold parameter. Such parameters are selected in accordance with the designated processor, hardware and software configuration set in the evaluate processor routine 420. Select processor-dependent parameters routine 430 typically accesses a memory structure such as a table to read these parameters using an indication of the configuration as an index into the table.

Each component of the source image in an MPEG encoder and decoder is divided into nonoverlapping blocks of 8-by-8 pixels. Each block is then transformed using the two-dimensional discrete cosine transform (DCT) with an 8-8 kernel.

The resulting 64 coefficients which are derived as a two-dimensional array of 8-8 numbers, represent frequency contents of the block. The DCT coefficient value in the upper left corner of a 2-dimensional array measures the energy of the zero-frequency or direct current (DC) term. Next the DCT coefficients are quantized. The quantization step size varies with frequency and component. The dependence on frequency reflects the fact that the high-frequency coefficients subjectively matter less than the low frequency coefficients and may therefore be quantized with a larger step size (that is, more coarsely). Following quantization, the coefficients are re-ordered into a one-dimensional array by reading out the entries of the two-dimensional array along a zigzag route. Thus, coefficients are approximately arranged in order of ascending frequency.

The pre-computed commonly occurring kernels procedure 440 precomputes the most frequently occurring kernels, which correspond to the most common DCT coefficients, for a particular IDCT computing method. For example, in some embodiments, a symmetric-mapped IDCT (SMIDCT) computing method is utilized for sparse DCT coefficient blocks. The symmetric mapped IDCT (SMIDCT) is disclosed in Hung AC, Meng THY, "A fast statistical inverse discrete cosine transform for image compression", In: Rodriguez AA (ed) SPIE/IS&T electronic imaging '94: Digital video compression on personal computers: Algorithms and techniques, V. 2187:196–205 which is hereby incorporated by reference. SMIDCT is advantageous for decoding extremely sparse DCT coefficient matrices. SMIDCT separates IDCT coefficients into four classes including even-even, even-odd, odd-even, odd-odd classes. Selection of a class depends on the symmetry of the kernel. Each class includes sixteen symmetric kernels. Each kernel is precisely symmetric or antisymmetric in both the u and v directions. The number of elements for a symmetric kernel is 16, rather than 64 elements of a typical kernel for an 8×8 IDCT operation. If u is even, a kernel is symmetric along the row or u direction. Otherwise the kernel is antisymmetric along the row direction. If v is even then a kernel is symmetric along the column or v direction and antisymmetric otherwise. SMIDCT accumulates DCT coefficients within each symmetric kernel class, amounting to 16 additions per nonzero coefficient, and then mutually combines the classes.

A simple method of combining each of the four kernel classes utilizes 3 additions for each of the 64 spatial values in the 8×8 matrix calculation. For a total of 192 addition operations for an 8×8 transform coefficient block. The number of operations is reduced by analyzing patterns of symmetry for the four kernel classes. This pattern is exploited using a two-dimensional row-column butterfly operation, requiring only 128 additions.

Figure 5:
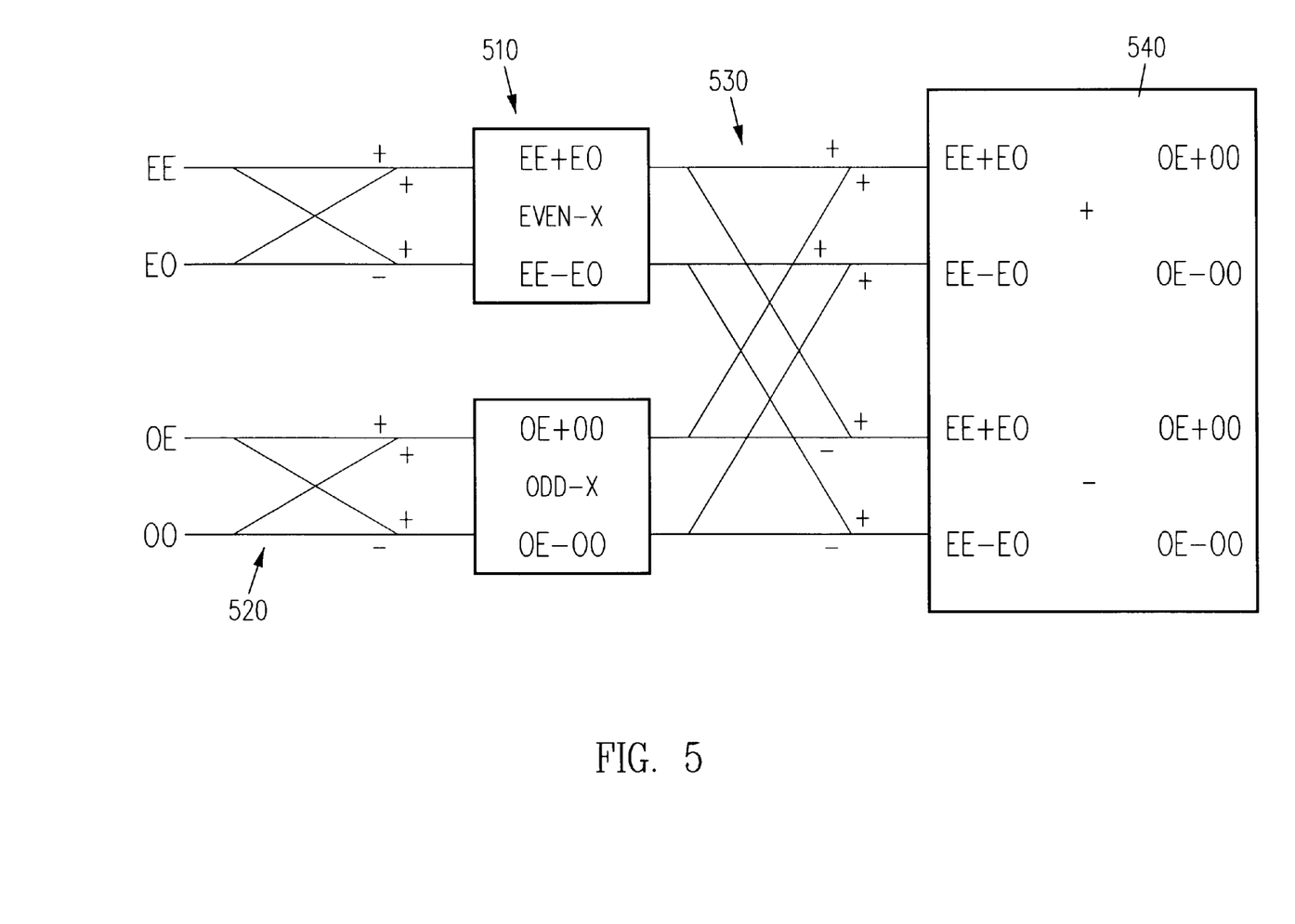
FIG. 5 depicts a butterfly circuit which is utilized in a symmetrical matrix inverse discrete cosine transform (SMIDCT) operation.

The four symmetric classes are combined in two butterfly stages as shown in FIG. 5. A first stage 510 applies a 4×4 butterfly 520 to an even-even and even-odd class 530 to obtain the class of all kernels that are even along the x axis (even-x). Similarly, an odd-even class and an odd-odd class are combined by a butterfly to obtain the class of kernels that are odd along the x axis (odd-x). The matrices that belong to these new classes are 4×8 rather than 4×4. The second stage 540 uses a 4×8 butterfly (or with two 4×4 butterflies shown in FIG. 5) to combine the even-x class and the odd-x class, obtaining the entire 8×8 spatial domain values. If some symmetric classes have no coefficients, performance of some butterflies is omitted.

TABLE 1 designates the butterflies utilized for different combinations of classes. This approach is termed "conditional butterflying". The conditional butterfly always saves computation compared to the 192 additions in the direct calculation of the kernel sum.

TABLE 1

| Classes present additions | Stage 1 additions | Stage 2 addition | Total |
|---|---|---|---|
| None | 0 | 0 | 0 |
| OO | 0 | 0 | 0 |
| OE | 0 | 0 | 0 |
| OO+OE | OO+OE=32 | 0 | 32 |
| EO | 0 | 0 | 0 |
| EO+OO | EO+OO=32 | 0 | 32 |
| EO+OE | EO+OE=32 | 0 | 32 |
| EO+OE−OO | OE+OO=32 | EO+[OE+OO]=64 | 96 |
| EE | 0 | 0 | 0 |
| EE+OO | EE+OO=32 | 0 | 32 |
| EE+OE | EE+OO=32 | 0 | 32 |
| EE+OE−OO | OE+OO=32 | EE+[OE+OO]=64 | 96 |
| EE+EO | EE+EO=32 | 0 | 32 |
| EE+EO+OO | EO+OO=32 | EE+[EO+OO]=64 | 96 |
| EE+EO+OE | EO+OE=32 | EE+[EO+OE]=64 | 96 |
| EE+EO+OE+OO | EE+EO=32 | [EE+EO]+[OE+OO]=64 | 128 |

Common DCT coefficients and corresponding precomputed kernels are respectively stored for later comparison to bitstream DCT coefficients and usage in place of computed IDCT values to reduce decoding computations. In some embodiments, the kernels are stored in a table in a memory. In other embodiments, the kernels are inserted into a program code to reduce the number of executed instructions to perform the IDCT procedure 450. Insertion of kernels into the program code in this manner is called a "self-modifying code". Self-modifying code is a program code that modifies itself during execution by writing new operation codes, addresses or data values over existing instructions. In the present instance, data values are written into the program code in the form of immediate-data-multiply instructions. Accordingly, a processor executes these immediate-data-multiply instructions in a very compact code which does not then utilize instructions to set up a lookup table pointer and to perform a table lookup access instruction. A few instructions of a program code are thus saved in routines which are repetitively executed a great number of times. Computational burden of the decoding operation is thus greatly reduced using a self-modifying code.

An IDCT procedure 450 selects an "optimal" procedure for computing the inverse discrete cosine transform (IDCT). The IDCT procedure 450 includes a preprocess DCT coefficient block step 460, an evaluate coefficients step 470, a select IDCT procedure step 480, a compute IDCT procedure 490, a monitor frame rate procedure 496 and an adjust IDCT parameters procedure 498.

Preprocess DCT coefficient step 460 selectively sets various DCT coefficients in a block to a zero value to increase processing speed of the inverse discrete cosine transform procedure at the cost of a slight reduction in video quality. Thus, IDCT processing speed is increased at the cost of a slight reduction in video quality by: (1) selectively eliminating all frequency coefficients higher than a cutoff frequency $F_{CUT}$ in the DCT coefficient block, and (2) using an "optimal" IDCT computation method to process sparse blocks of DCT coefficients. Similarly, frequency coefficients having a magnitude smaller than a cutoff magnitude $M_{CUT}$ are eliminated. The decision thresholds, cutoff frequency $F_{CUT}$ and cutoff magnitude $M_{CUT}$ are adaptively selected based on the capabilities of the processor and whether the desired frame rate is achieved. Thus, if the desired frame rate is not achieved then the cutoff frequency $F_{CUT}$ is selectively reduced, the cutoff magnitude $M_{CUT}$ is selectively increased or both so that computational requirements are reduced. In various embodiments of the video system 10, the different preprocessing procedures of preprocess DCT coefficient step 460 are individually enabled and disabled so that zeroing of DCT coefficients based on DCT coefficient cutoff frequency $F_{CUT}$ and DCT coefficient cutoff magnitude $M_{CUT}$ are selected individually or in combination.

Evaluate coefficients step 470 examines the coefficients in a block of DCT coefficients to determine various information concerning the coefficients. For example, in some embodiments evaluate coefficients step 470 determines the number of zero-valued coefficients, the number of nonzero-valued coefficients and the relative proportion of coefficients having a value of zero, compared to the number of coefficients having a nonzero value. In some embodiments, the values of the nonzero DCT coefficients is examined in combination with the number of nonzero DCT coefficients in a block. For example, if the number of nonzero DCT coefficients is small and the values of the nonzero coefficients are also small, this condition is noted.

In addition to determining the number of zero-valued and nonzero-valued coefficients, evaluate coefficients step 470 also examines the coefficients in the block of DCT coefficients to determine whether the coefficients are substantially similar to the most common DCT coefficients, which are stored in pre-compute commonly occurring kernels procedure 440 during initialization 410. If the bitstream coefficients are substantially similar to the saved common DCT coefficients, this condition is noted and an identifier of the corresponding precomputed kernels is stored.

Select IDCT procedure step 480 selects an optimal IDCT procedure from a table of IDCT procedures. The selection is based on the relative proportion of non-zero to zero-valued coefficients. One class of coefficient block is called a sparse block. A sparse block has a very small number of nonzero coefficients. A second class of coefficient block is called a non-sparse block. A non-sparse block has a large number of nonzero coefficients.

Other IDCT procedures are advantageous under particular conditions. For example,a scaled IDCT procedure utilizes scaling of all input DCT coefficients before applying the scaled IDCT transform. One advantage of prescaling is that it is combined with an inverse quantization stage at the decoder, thereby achieving both prescaling and inverse quantization for the cost of one multiply. Another advantage of the scaled IDCT procedure is that prescaling does not have to occur for input transform coefficients that are zero-valued. Another IDCT procedure is a Feig IDCT method which utilizes the fewest known number of multiplication operations. The scaled IDCT procedure and the Feig IDCT procedure are described in Hung AC, Meng THY, "A comparison of fast inverse discrete cosine transform algorithms", Multimedia Systems, 2:204–217, 1994 which is hereby incorporated by reference.

Relative speed performance, measured in Kblks/s, between different IDCT techniques varies according to processor type. For example, a Sparc processor significantly favors the SMIDCT and a Scaled IDCT method over other techniques. However, the differences in performance of the SMIDCT and scaled IDCT techniques for a MIPS processor are less apparent. The Scaled IDCT performs better than other algorithms when a quantization scale factor is small and the input is not very sparse. On some machines the reduction in multiplications by nesting the odd-odd symmetric class may be worthwhile. The Scaled IDCT is most advantageous at low sparseness. SMIDCT is most advantageous at high sparseness, sometimes achieving nearly 100% speed improvement over other techniques.

If a block is a sparse block with a small number of nonzero coefficients, the number of nonzero coefficients determines what IDCT method is used. If the number of nonzero coefficients is less than a predetermined number of coefficient $N_{NZMIN}$, then a null IDCT procedure is selected so that the inverse discrete transform is not computed and the pixel values are set to the value of the DC coefficient. By not computing the IDCT, processing speed is increased at the cost of a slight reduction in video quality. In some embodiments, the values of the nonzero DCT coefficients is analyzed in combination with the number of nonzero DCT coefficients in a block. For example, if the number of nonzero DCT coefficients is less than $N_{NZMIN}$ and the values of the nonzero coefficients are also small, the null IDCT procedure is selected.

If a block is a sparse block, the number of nonzero coefficients is greater than $N_{NZMIN}$ and the bitstream DCT coefficients are substantially similar to saved common DCT coefficients, as noted in evaluate coefficients step 470, then no inverse discrete cosine transform is computed and prestored kernels designated in the evaluate coefficients step 470 are used in place of computed kernels. Thus, prestored kernels are selected.

If a block is a sparse block, the number of nonzero coefficients is greater than $N_{NZMIN}$ and bitstream DCT coefficients are not substantially similar to saved common DCT coefficients, then an IDCT computing method which is optimized for sparse blocks is selected. One procedure that performs well for sparse blocks separates DCT coefficients into four symmetric classes and uses the symmetries present in the DCT basis matrices to reduce the number of operations utilized in computing the IDCT by directly operating on reduced basis matrices. For a small number of nonzero DCT coefficients, a decrease in processing time of a factor of approximately ten can be achieved. This sparse-block optimized procedure is called a symmetric mapped IDCT (SMIDCT) (SPIE/IS&T Electronic Imaging 94 Vol. 2187:pp. 196–205, August 1984).

For a non-sparse block, which has a large number of nonzero coefficients, select IDCT procedure step 480 selects an IDCT computing method which is optimized for non-sparse DCT blocks. For example, one procedure that performs well for nonsparse blocks computes the 8×8 2D IDCT by computing eight one-dimensional IDCTs on the rows of the block and then computes eight one-dimensional IDCTs on the columns. Each one-dimensional transform is performed using an optimal one-dimensional transform such as a Chen-Wang Algorithm (IEEE ASSP-32, pp. 803–816, August 1984). The Chen-Wang algorithm employs 11 multiplication and 29 add operations for a one-dimensional transform and, therefore 176 multiplication and 464 addition operations in a two-dimensional transform (16×11 and 16×29, respectively).

Compute IDCT procedure 490 computes an inverse discrete cosine transform in accordance with the selected IDCT method. For example, the symmetric mapped IDCT (SMIDCT) is selected for sparse blocks of DCT coefficients.

An 8×8 forward discrete cosine transform (DCT) is defined by the following equation:

$$X(u, v) = (1/4)C(u)C(v)\sum_{i=0}^{7}\sum_{j=0}^{7} x(i, j)\cos\left(\frac{\pi(2i+1)u}{16}\right)\cos\left(\frac{\pi(2j+1)v}{16}\right);$$

where x(i,j) is a pixel value in an 8×8 image block in spatial domains i and j, and X (u,v) is a transformed coefficient in an 8×8 transform block in transform domains u,v. C(0) is $1/\sqrt{2}$ and C(u)=C(v)=1.

An inverse discrete cosine transform (IDCT) is defined by the following equation:

$$x(i, j) = (1/4)\sum_{i=0}^{7}\sum_{j=0}^{7} C(u)C(v)X(u, v)\cos\left(\frac{\pi(2i+1)u}{16}\right)\cos\left(\frac{\pi(2j+1)v}{16}\right).$$

An 8×8 IDCT is considered to be a combination of a set of 64 orthogonal DCT basis matrices, one basis matrix for each two-dimensional frequency (v, u). Furthermore, each basis matrix is considered to be the two-dimensional IDCT transform of each single transform coefficient set to one. Since there are 64 transform coefficients in an 8×8 IDCT, there are 64 basis matrices. The IDCT kernel K(v, u), also called a DCT basis matrix, represents a transform coefficient at frequency (v, u) according to the equation:

$$K(v, u) = v(u)v(v) \cos((2m+1)\pi u/16) \cos((2n+1)\pi v/16),$$

where v(u) and v(v) are normalization coefficients defined as v(u)=1/√8 for u=0 and v(u)=1/2 for u>0. The IDCT is computed by scaling each kernel by the transform coefficient at that location and summing the scaled kernels. The spatial domain matrix S is obtained using the equation, as follows:

$$S = \sum_{v}\sum_{u} F_{vu}K(v, u).$$

Monitor frame rate step 496 determines an achieved frame rate of the video system 10, for example by reading a system clock register (not shown) and comparing the elapsed time with a prestored frame interval corresponding to a desired frame rate. If the achieved frame rate is slower than the preset desired frame rate, this condition is noted. In some embodiments, an insufficient frame rate condition is noted for each instance of an inadequate frame rate. In other embodiments, the insufficient frame rate condition is noted when an a calculated average desired frame rate is violated over a predetermined number of frames. In further additional embodiments, the insufficient frame rate condition is noted even when the achieved frame rate is faster than the desired frame rate if the achieved frame rate is not faster than the desired frame rate by a predetermined margin.

The adjust IDCT parameters procedure 498 adjusts parameters including the non-zero coefficient threshold N, frequency F and magnitude M according to the achieved frame rate as determined in monitor frame rate step 496. For example, in some embodiments the threshold number of nonzero coefficients $N_{NZMIN}$ is adaptively selected based on the capabilities of the processor and the relationship of the achieved and desired frame rates. For example, the operating speed capabilities of various processors are analyzed and a table is made which correlates processor capability to an appropriate threshold number of coefficients $N_{NZMIN}$. If, in practice, the desired frame rate is not achieved, then the number of nonzero coefficients $N_{NZMIN}$ is increased so that fewer inverse discrete cosine computations are performed, thereby reducing computational requirements.

Figure 6:
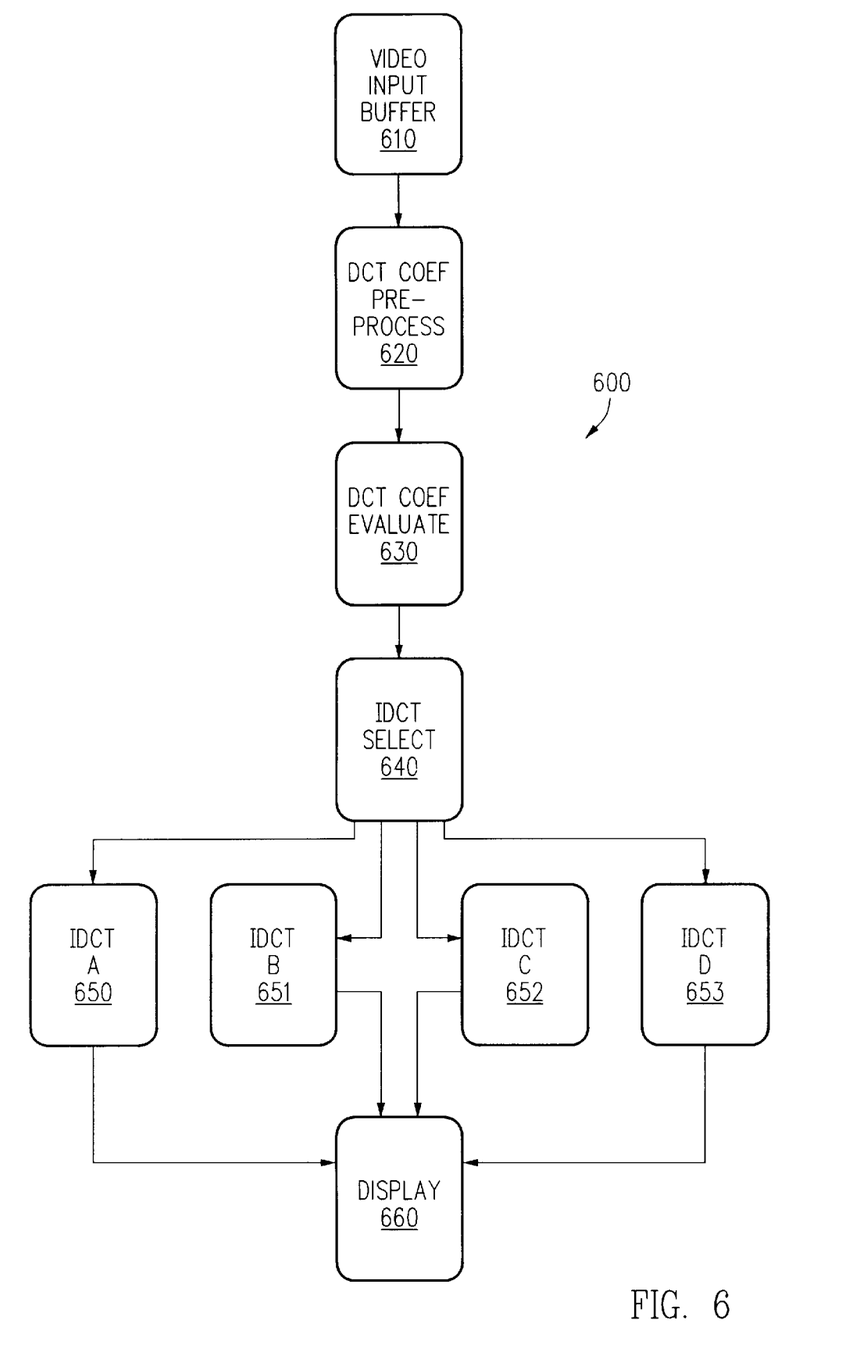
FIG. 6 illustrates an embodiment of video processing and display apparatus utilizing decompression by selective optimization of IDCT procedures.

Referring to FIG. 6, there is shown an embodiment of video processing and display apparatus 600 utilizing decompression by selective optimization of IDCT procedures. Apparatus 600 includes a video input buffer 610 which supplies a video bitstream made up of various codes and decoding information elements. The coded picture information includes coded DCT coefficients. The coded DCT coefficients are decoded into 8×8 element DCT coefficient blocks. A DCT coefficient block preprocessing circuit 620 receives DCT coefficient blocks from the video input buffer 610. Preprocessing circuit 620 selectively sets various DCT coefficients in a block to DCT coefficients to a zero value to increase processing speed of the inverse discrete cosine transform procedure at the cost of a slight reduction in video quality. A DCT coefficient block evaluating circuit 630 receives the preprocessed DCT coefficient blocks from the preprocessing circuit 620. The evaluating circuit 630 examines the coefficients in a DCT coefficient block before computation of the inverse discrete cosine transform operation. Based on the number of non-zero coefficients, an inverse discrete cosine transform (IDCT) selection circuit 640 selects an optimal IDCT procedure for processing of the coefficients. Several inverse discrete cosine transform (IDCT) engines IDCT A 650, IDCT B 651, IDCT C 652 and IDCT D 653, are available for selective activation by the selection circuit 640. A display 660 is utilized to display the inverse discrete cosine transformed coefficients. Typically, the inverse discrete cosine transformed coefficients are combined with other data prior to display. For example, video systems that comply with various imaging coding standards, such as the MPEG standard, utilize video compression in which blocks of pixels in a picture or a series of pictures are encoded using prediction. In prediction encoding, pixels in a predicted picture are predicted from a previous picture using a motion compensation operation in which pixels have generally the same values as pixels of the previous picture except that pixels are shifted. A motion compensated picture is compactly encoded by storing the motion vector from the previous picture to the predicted picture. To more accurately encode the predicted picture, error terms are added to the motion compensated picture to account for differences between the motion compensated picture and the actual previous picture. At the encoder, the error terms are transformed using the discrete cosine transform (DCT) and quantized to reduce the number of bits encoded. At the decoder, the error terms are computed by inverse quantization and inverse discrete cosine transformation (IDCT). The result of the IDCT operation are restored error terms. A motion compensated picture is reconstructed in accordance with the encoded motion vector. Restored error terms are added to pixels of the reconstructed motion compensated picture.

Figure 7:
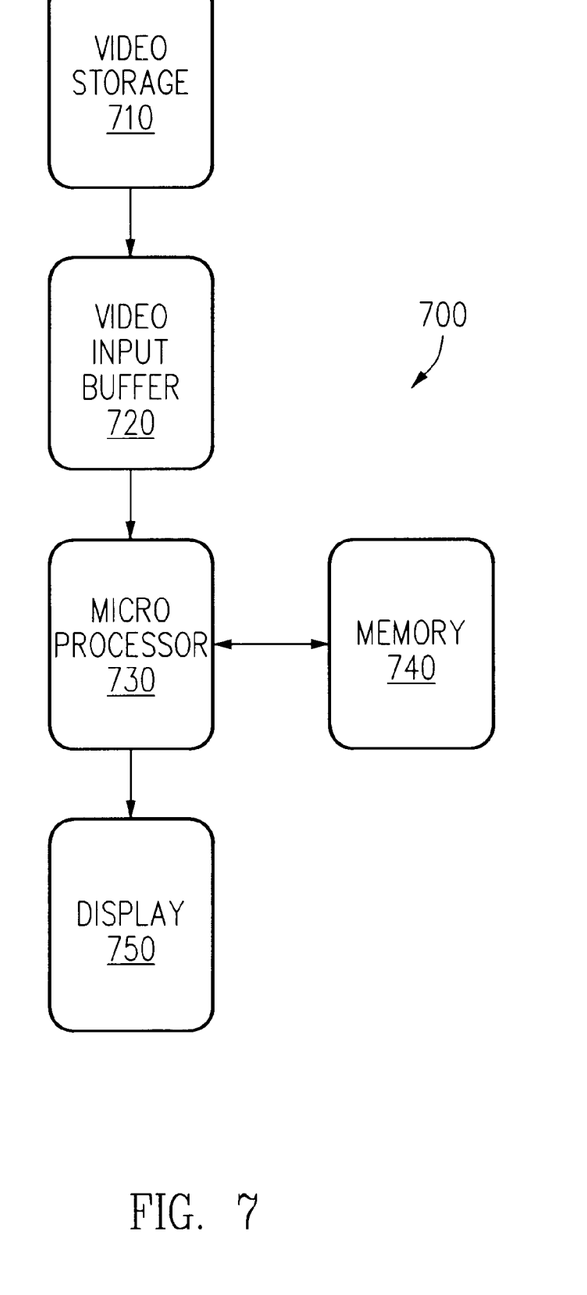
FIG. 7 illustrates an embodiment of a video processing and display computer system employing video decompression by selective optimization of IDCT procedures.

Referring to FIG. 7, there is shown an embodiment of a video processing and display computer system 700 employing video decompression by selective optimization of IDCT procedures. A video storage system 710 stores encoded video information. A video input buffer 720 is connected to the video storage system 710 for transferring coded video information to a microprocessor 730. The microprocessor 730 executes a computer program stored in memory 740 which performs video processing and display functions including, for example, the procedure of video decompression by selective optimization of IDCT procedures discussed with respect to FIG. 4. Video information processed by the microprocessor 730 is displayed on display 750.

The description of certain embodiments of this invention is intended to be illustrative and not limiting. Numerous other embodiments will be apparent to those skilled in the art, all of which are included within the broad scope of this invention. For example, the embodiments described herein are computer-based implementations. Electronic circuit based embodiments which perform the same function are expressly included within the scope of the claims.

What is claimed is:

1. A method of decoding video pictures comprising:

accessing a block of DCT coefficients, a block of DCT coefficients including a plurality of DCT coefficients, the DCT coefficients relating to a predetermined spatial frequency;

preprocessing the block of DCT coefficients by modifying selected coefficients of the plurality of coefficients including:
 selecting a cutoff frequency, including:
  evaluating a speed capability of a processor performing the method; and
  selecting a cutoff frequency in accordance with the evaluation of the processor speed capability; and
 setting the coefficients relating to a spatial frequency higher than the selected cutoff frequency to a zero value;

evaluating the preprocessed block of DCT coefficients to determine a classification of DCT characteristics;

selecting an inverse discrete cosine transform (IDCT) technique from a plurality of distinctive IDCT techniques based on the classification of DCT characteristics determined by the evaluating step; and calculating an inverse discrete cosine transform (IDCT) of the preprocessed block of DCT coefficients utilizing the selected IDCT technique.

2. A method according to claim 1 wherein the step of selecting a cutoff frequency in accordance with the evaluation of processor speed capability includes the steps of:

furnishing a table correlating processor identification to cutoff frequency;

accessing a processor identification code in the processor;

addressing the table using an indication of the identification code; and reading the addressed cutoff frequency from the table.

3. A method according to claim 1 wherein the step of selecting a cutoff frequency includes the steps of:

determining an operating frame rate of decoding video pictures;

comparing the determined operating frame rate to a predetermined desired frame rate; and setting a cutoff frequency in accordance with the comparison of operating frame rate to desired frame rate.

4. A method of decoding video pictures comprising:

accessing a block of DCT coefficients, a block of DCT coefficients including a plurality of DCT coefficients, the DCT coefficients relating to a predetermined spatial frequency;

preprocessing the block of DCT coefficients by modifying selected coefficients of the plurality of coefficients including:
 selecting a cutoff magnitude, including:
  evaluating a speed capability of a processor performing the method; and
  selecting the cutoff magnitude in accordance with the evaluation of the processor speed capability; and
 setting the coefficients having a magnitude smaller than the selected cutoff magnitude to a zero value;

evaluating the preprocessed block of DCT coefficients to determine a classification of DCT characteristics;

selecting an inverse discrete cosine transform (IDCT) technique from a plurality of distinctive IDCT techniques based on the classification of DCT characteristics determined by the evaluating step; and calculating an inverse discrete cosine transform (IDCT) of the preprocessed block of DCT coefficients utilizing the selected IDCT technique.

5. A method according to claim 4 wherein the step of selecting a cutoff magnitude in accordance with the evaluation of processor speed capability includes the steps of:

furnishing a table correlating processor identification to cutoff magnitude;

accessing a processor identification code in the processor;

addressing the table using an indication of the identification code; and reading the addressed cutoff magnitude from the table.

6. A method according to claim 4 wherein the step of selecting a cutoff magnitude includes the steps of:

determining an operating frame rate of decoding video pictures;

comparing the determined operating frame rate to a predetermined desired frame rate; and setting a cutoff magnitude in accordance with the comparison of operating frame rate to desired frame rate.

7. A video processing and display system comprising:

a video storage system;

a video buffer coupled to the video storage system;

a processor coupled to the video buffer;

a memory coupled to the processor and including a data memory and a program code for decoding video pictures, the program code including:

a program code for accessing a block of DCT coefficients, a block of DCT coefficients including a plurality of DCT coefficients;

a program code for preprocessing the block of DCT coefficients by modifying selected coefficients of the plurality of coefficients including:

a program code for selecting a cutoff frequency, including:

a program code for evaluating a speed capability of the processor; and a program code for selecting a cutoff frequency in accordance with the evaluation of the processor speed capability; and a program code for setting the coefficients relating to a spatial frequency higher than the selected cutoff frequency to a zero value;

a program code for evaluating the preprocessed block of DCT coefficients to determine a classification of DCT characteristics;

a program code for selecting an inverse discrete cosine transform (IDCT) technique from a plurality of distinctive IDCT techniques based on the classification of DCT characteristics determined by the evaluating step; and a program code for calculating an inverse discrete cosine transform (IDCT) of the preprocessed block of DCT coefficients utilizing the selected IDCT technique.

8. A video processing and display system comprising:

a video storage system;

a video buffer coupled to the video storage system;

a processor coupled to the video buffer;

a memory coupled to the processor and including a data memory and a program code for decoding video pictures, the program code including:

a program code for accessing a block of DCT coefficients, a block of DCT coefficients including a plurality of DCT coefficients;

a program code for preprocessing the block of DCT coefficients by modifying selected coefficients of the plurality of coefficients including:

a program code for selecting a cutoff magnitude, including:

a program code for evaluating a speed capability of the processor; and a program code for selecting the cutoff magnitude in accordance with the evaluation of the processor speed capability; and a program code for setting the coefficients having a magnitude smaller than the selected cutoff magnitude to a zero value;

a program code for evaluating the preprocessed block of DCT coefficients to determine a classification of DCT characteristics;

a program code for selecting an inverse discrete cosine transform (IDCT) technique from a plurality of distinctive IDCT techniques based on the classification of DCT characteristics determined by the evaluating step; and a program code for calculating an inverse discrete cosine transform (IDCT) of the preprocessed block of DCT coefficients utilizing the selected IDCT technique.

* * * * *